(12) United States Patent
Arsenault (10) Patent No.: US 10,597,008 B1
(45) Date of Patent: Mar. 24, 2020

(54) BRAKE VARIATION DERIVED CONTROLLER RE-SET SCHEDULE

(71) Applicant: Goodrich Corporation, Charlotte, NC (US)

(72) Inventor: Tyler Arsenault, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/160,835

(22) Filed: Oct. 15, 2018

(51) Int. Cl.
| | |
|---|---|
| *B60T 8/17* | (2006.01) |
| *B60T 8/171* | (2006.01) |
| *B60T 8/172* | (2006.01) |
| *B60T 8/1761* | (2006.01) |
| *B60T 8/58* | (2006.01) |
| *B60T 8/32* | (2006.01) |
| *G05B 19/416* | (2006.01) |
| *F16D 55/36* | (2006.01) |
| *B64C 25/44* | (2006.01) |

(52) U.S. Cl.
CPC ............ *B60T 8/1703* (2013.01); *B60T 8/171* (2013.01); *B60T 8/172* (2013.01); *B60T 8/17616* (2013.01); *B60T 8/325* (2013.01); *B60T 8/58* (2013.01); *G05B 19/416* (2013.01); *B60T 2210/12* (2013.01); *B60T 2240/00* (2013.01); *B60T 2270/10* (2013.01); *B64C 25/44* (2013.01); *F16D 55/36* (2013.01); *G05B 2219/42047* (2013.01)

(58) Field of Classification Search
CPC ........ B60T 8/1703; B60T 8/171; B60T 8/172; B60T 8/17616; B60T 8/325; B60T 8/58; B60T 2210/13; B60T 13/662; G05B 19/416
See application file for complete search history.

(56) References Cited

U.S. PATENT DOCUMENTS

| | | | |
|---|---|---|---|
| 3,856,365 A | 12/1974 | Steigerwald et al. | |
| 4,484,282 A | 11/1984 | Cook et al. | |
| 4,562,542 A | 12/1985 | Skarvada | |
| 5,050,940 A | 9/1991 | Bedford et al. | |
| 5,951,122 A | 9/1999 | Murphy | |

(Continued)

FOREIGN PATENT DOCUMENTS

| | | |
|---|---|---|
| CN | 1675095 | 9/2005 |
| CN | 201914232 | 8/2011 |

(Continued)

OTHER PUBLICATIONS

Machine Translation WO 2015101679 published Jul. 2015 (Espacenet) (Year: 2015).*

*Primary Examiner* — Faris S Almatrahi
*Assistant Examiner* — Andrew J Cromer
(74) *Attorney, Agent, or Firm* — Snell & Wilmer L.L.P.

(57) ABSTRACT

A method for controlling a braking operation applied to a wheel of a wheel assembly includes receiving a command signal in proportion to an amount of braking requested at an input device; outputting a control signal in proportion to the command signal; receiving a wheel speed signal indicative of a speed of the wheel; calculating an adjustment signal in proportion to the wheel speed signal; providing a modified control signal to a brake actuator based on the control signal and the adjustment signal; and continually resetting a reset schedule based on the wheel speed signal.

20 Claims, 5 Drawing Sheets

(56) References Cited

U.S. PATENT DOCUMENTS

| | | | |
|---|---|---|---|
| 6,125,318 | A | 9/2000 | Zierolf |
| 6,241,325 | B1 | 6/2001 | Gowan et al. |
| 6,711,488 | B2 | 3/2004 | Zierolf |
| 6,851,649 | B1 | 2/2005 | Radford |
| 7,165,820 | B2 | 1/2007 | Rudd, III |
| 7,837,279 | B2 | 11/2010 | Salamat et al. |
| 7,938,494 | B2 | 5/2011 | Ribbens et al. |
| 2008/0221768 | A1* | 9/2008 | Salamat ............... B60T 8/1703 701/74 |
| 2017/0210362 | A1* | 7/2017 | Al-Tabakha .......... B60T 8/1703 |

FOREIGN PATENT DOCUMENTS

| | | |
|---|---|---|
| EP | 2081804 | 1/2013 |
| WO | WO-2015101679 A1 * | 7/2015 |

* cited by examiner

BRAKE VARIATION DERIVED CONTROLLER RE-SET SCHEDULE

FIELD

This disclosure relates to braking systems and methods, such as suitable for use in an aircraft.

BACKGROUND

Various types of braking systems are known, including, for example, electrical, mechanical, electromechanical, hydraulic, and pneumatic braking systems, etc. Each type finds utility in various applications.

In aircraft braking and/or other applications, it is easier to recognize and/or mitigate skids at higher speeds of travel than it is to do so at slower speeds of travel.

SUMMARY

In various embodiments, a brake control system for controlling a braking operation applied to a wheel of a wheel assembly includes at least the following: a brake control unit configured to output a control signal to a Proportional Integral Derivative (PID); the PID controller in communication with the brake control unit, the PID controller configured to receive the control signal from the brake control unit and an adjustment signal from an antiskid brake controller and output a modified control signal; a wheel speed sensor configured to output a wheel speed signal indicative of a speed of a wheel to the antiskid brake controller; and the antiskid brake controller in communication with the PID controller and with the wheel speed sensor, the antiskid brake controller configured to receive the wheel speed signal from the wheel speed sensor and to provide the adjustment signal to the PID controller; wherein the antiskid brake controller provides the adjustment signal to the PID controller in proportion to the wheel speed signal; wherein the modified control signal is adjusted based on the control signal and the adjustment signal; and wherein a reset schedule of an integrator of the PID controller is continually reset based on the wheel speed signal.

In various embodiments: the modified control signal is adjusted during the braking operation; and/or the modified control signal is adjusted throughout the braking operation; and/or the wheel speed sensor measures a speed of the wheel during the braking operation; and/or the speed of the wheel is based on measuring an angular velocity of the wheel multiplied by a radius of the wheel; and/or the adjustment signal is based, at least in part, on at least one of a reference speed signal and a mu-slip curve; and/or the adjustment signal comprises a first threshold at a first speed and a second threshold at a second speed, wherein the first speed is slower than the second speed and the first threshold is smaller than the second threshold; and/or the wheel assembly is configured for use in an aircraft.

In various embodiments, a method for controlling a braking operation applied to a wheel of a wheel assembly includes at least the following: receiving a command signal in proportion to an amount of braking requested at an input device; outputting a control signal in proportion to the command signal; receiving a wheel speed signal indicative of a speed of the wheel; calculating an adjustment signal in proportion to the wheel speed signal; providing a modified control signal to a brake actuator based on the control signal and the adjustment signal; and continually resetting a reset schedule based on the wheel speed signal.

In various embodiments: the method for controlling the braking operation further includes braking the wheel in proportion to the modified control signal; and/or adjusting the adjustment signal during the braking operation; and/or adjusting the adjustment signal throughout the braking operation; and/or adjusting the modified control signal during the braking operation; and/or adjusting the modified control signal throughout the braking operation; and/or calculating the adjustment signal based, at least in part, on at least one of a reference speed signal and a mu-slip curve.

In various embodiments, a brake control system for controlling a braking operation applied to a wheel of a wheel assembly includes at least the following: a non-transitory memory configured to store instructions; and one or more processors in electronic communication with the non-transitory memory, the one or more processors configured to: receive a command signal in proportion to an amount of braking requested at an input device; output a control signal in proportion to the command signal; receive a wheel speed signal indicative of a speed of the wheel; calculate an adjustment signal in proportion to the wheel speed signal; provide a modified control signal to a brake actuator based on the control signal and the adjustment signal; and continually reset a reset schedule based on the wheel speed signal.

In various embodiments: the one or more processors are further configured to: brake the wheel in proportion to the modified control signal; and/or at least one of receive the wheel speed signal during the braking operation, calculate the adjustment signal during the braking operation; and provide the modified control signal during the braking operation; and/or at least one of receive the wheel speed signal throughout the braking operation, calculate the adjustment signal throughout the braking operation, and provide the modified control signal throughout the braking operation; and/or calculate the adjustment signal based, at least in part, on at least one of a reference speed signal and a mu-slip curve.

BRIEF DESCRIPTION OF THE DRAWINGS

The accompanying drawings illustrate various embodiments employing the principles described herein and are a part of the specification. The illustrated embodiments are meant for description only, and they do not limit the scope of the claims, and in which:

DETAILED DESCRIPTION

This detailed description of exemplary embodiments references the accompanying drawings, which show exemplary embodiments by way of illustration. While these exemplary embodiments are described in sufficient detail to enable those skilled in the art to practice this disclosure, it should be understood that other embodiments may be realized and that logical changes and adaptations in design and construction may be made in accordance with this disclosure and the teachings herein described without departing from the scope and spirit hereof. Thus, this detailed description is presented for purposes of illustration only and not of limitation.

In accordance with various aspects of this disclosure, systems and methods are described herein for mitigating the effects of brake skid, uncontrolled braking, and/or wheel lock (collectively referred to herein as a skid). In various embodiments, the systems and methods described herein provide a dynamic skid response in relation to wheel speed.

Figure 1:
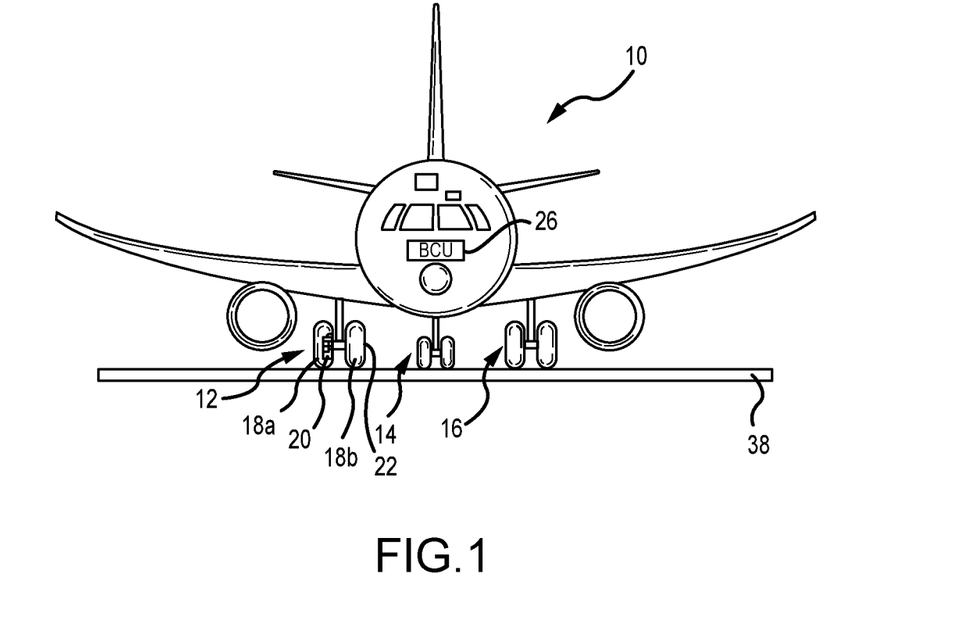
FIG. 1 is a representative illustration of an aircraft having multiple landing gears and wheel assemblies, in accordance with various embodiments.

Referring now to FIG. 1, a representative aircraft 10 includes one or more landing gear systems, such as a first landing gear 12, a second landing gear 14, and a third landing gear 16. In various embodiments, the second landing gear 14 is also a nose landing gear for the aircraft 10. Referring generally, the first landing gear 12, the second landing gear 14, and the third landing gear 16 support the aircraft 10 when the aircraft 10 is not flying, such as when the aircraft 10 is taxing, taking off, landing, and/or parking, as well as when the aircraft 10 is at rest. Operationally, the first landing gear 12, the second landing gear 14, and the third landing gear 16 are retractable into a body and/or fuselage of the aircraft 10 when the aircraft 10 is in flight and/or not supporting the aircraft 10, in various embodiments.

While FIG. 1 depicts a representative aircraft 10 for convenience of illustration, the braking systems and methods described herein are not limited to aircraft applications, but find equivalent utility in other brake and brake skid applications as well, including automotive, locomotive, vehicular, and/or other applications.

In various embodiments, the first landing gear 12, the second landing gear 14, and/or the third landing gear 16 each include one or more wheel assemblies 18. For example, the first landing gear 12 includes an outer wheel assembly 18a and an inner wheel assembly 18b, in various embodiments. In various embodiments, each of the wheel assemblies 18 includes a brake 20, a wheel 22, and a wheel speed sensor 24 (see also FIG. 3). For example, the first landing gear 12 includes a brake 20 within the outer wheel assembly 18a, in various embodiments. In operation, the various wheel assemblies 18 receive braking force inputs to apply to the brake 20 to act on the wheel 22, such as upon receiving a brake command from a brake control unit (BCU) 26, as elaborated upon herein.

In various embodiments, the aircraft 10 includes a BCU 26 aboard the aircraft 10. In various embodiments, the BCU 26 controls, at least various parts of, the braking of the aircraft 10. For example, in various embodiments, the BCU 26 controls various parameters of braking, such as antiskid braking, automatic brake control, landing gear retraction, locked wheel protection, manual brake control, park capabilities, touchdown protection, etc.

Figure 2:
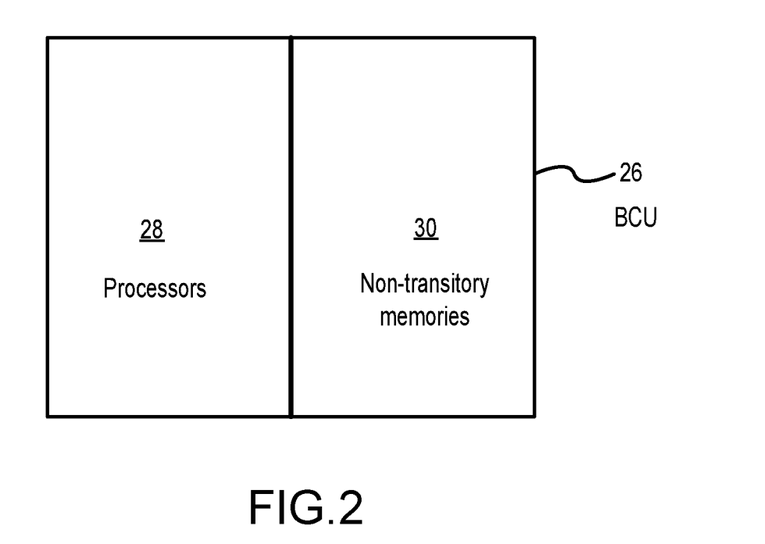
FIG. 2 is a block diagram including several components of the brake control unit of FIG. 1, in accordance with various embodiments.

Referring now also to FIG. 2, the BCU 26 (and/or other controllers) includes one or more processors 28 and one or more tangible, non-transitory memories 30 capable of implementing digital or programmatic logic. In various embodiments, for example, the processors 28 comprise one or more of an application specific integrated circuit (ASIC), digital signal processor (DSP), field programmable gate array (FPGA), general purpose processor, and/or other programmable logic device, discrete gate, transistor logic, or discrete hardware components, etc., and the one or more memories 30 store machine-readable instructions that are implemented by the one or more processors 28 for performing various functions, such as mitigating the effects of a brake skid at different wheel speeds, as described herein in various embodiments.

Figure 3:
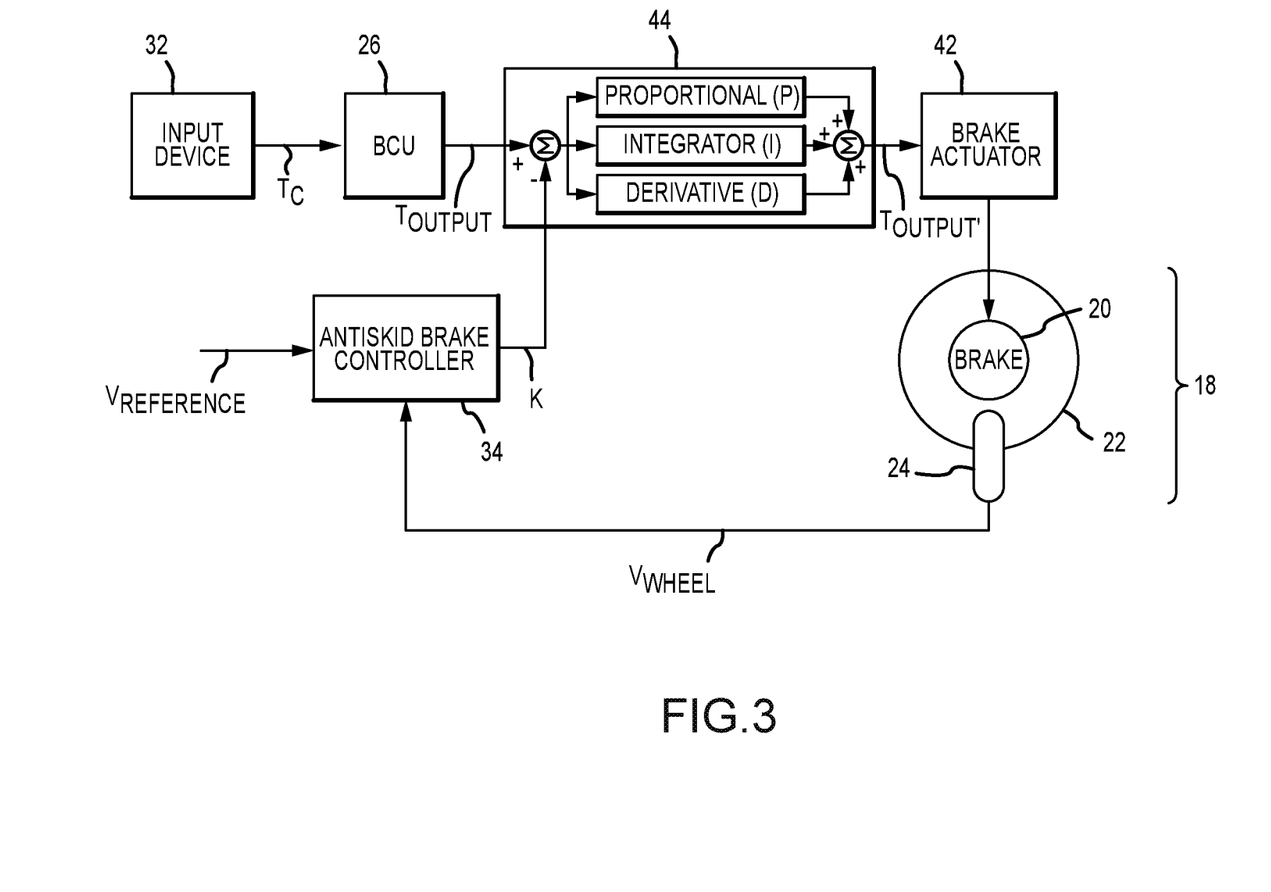
FIG. 3 is a block diagram of a brake control system including an antiskid brake controller, in accordance with various embodiments.

Referring now also to FIG. 3, in direct braking systems, the pressure applied to the brake 20 is proportional to the pressure applied to an input device 32, such as to brake pedals of the aircraft 10. In augmented braking systems, on the other hand, the pressure commanded by the input device 32 is controlled and/or driven by a position sensor and/or pressure sensor proximate the input device 32. For example, in a hydraulic braking system, a braking force is applied to the brake 20 in proportion to a force or pressure detected by a sensor(s) at the input device 32, transferring braking pressure from the input device 32 to the wheel assembly 18 and to the brake 20.

In various embodiments, an antiskid brake controller 34 compares the speed of the aircraft 10 derived from the wheel speed sensor 24 to the speed of the aircraft 10 derived from a reference source. Accordingly, if the wheel 22 is determined to be slipping by an excessive amount (i.e., skidding), then brake pressure applied to that wheel 22 is released, and the wheel 22 is allowed to spin-up to an appropriate speed before the BCU 26 begins braking that wheel 22 again.

Figure 4:
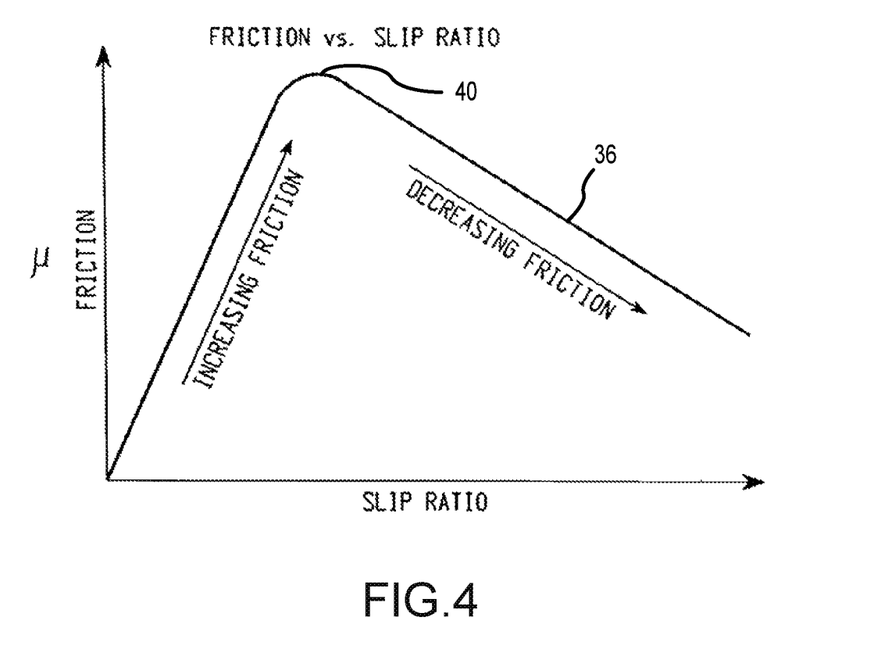
FIG. 4 is a mu-slip curve, in accordance with various embodiments.

In various embodiments, the antiskid brake controller 34 responds according to a mu-slip curve 36 with a peak 40, such as shown in FIG. 4. Mu (i.e., mu or u) is the coefficient of friction between the wheel 22 and a running surface, such as a runway 38 (see FIG. 1), and a mu-slip curve 36 plots slip ratio against mu. Referring generally, a difference between wheel velocity and vehicle velocity is referred to as slip velocity, and slip ratios are calculated by dividing slip velocities by vehicle velocities. In the mu-slip curve 36 in FIG. 4, for example, slip ratio is plotted on a first (e.g., x) axis, and the coefficient of friction mu is plotted on a second (e.g., y) axis orthogonal to the first axis. However, mu also changes in relationship to the temperature of the brake 20. For example, as the brake 20 is used, it requires less pressure to generate an equivalent torque during the course of a stop. Accordingly, the schedule of an integrator I of a Proportional Integral Derivative (PID) controller 44 is tailored to mitigate this effect. During lower temperature mu periods, for example, the threshold to detect a skid is tighter, and during higher temperature mu periods, for example, the thresholds are varied proportionately. Referring generally, a high slip ratio implies the brake 20 is undergoing a skid, and the BCU 26 undergoes skid remediation (e.g., the BCU 26 briefly releases the brake 20 and then reapplies the brake 20) to correct the skid. In various embodiments, however, it is more difficult to mitigate the skid at lower wheel speeds. As a result, the threshold of the slip ratio is varied—e.g., lowered at lower speeds to detect more skids and trigger skid mitigation, and higher at higher speeds to allow more skids—according to wheel speed and continually checked against a reference speed during and throughout the course of a braking event (e.g., a slowdown, stop, etc.).

In various embodiments, the PID controller 44 is a three term controller comprising a control loop feedback mechanism that continually calculates an error value as a difference between a control signal $T_{OUTPUT}$ and a modified control signal $T_{OUTPUT}'$ as will be elaborated upon. More specifically, the PID controller 44, as a feedback controller, applies a correction based on proportional, integral, and derivative terms input thereinto.

Referring again to FIG. 3, during a braking event, an operator activates the input device 32 to request a braking function from the BCU 26, and that activation is converted into a command signal $T_C$ indicative of the amount of activation requested by the input device 32. The command signal $T_C$ is provided to the BCU 26, which outputs the control signal $T_{OUTPUT}$ in proportion to the command signal $T_C$.

In various embodiments, the BCU 26 provides the control signal $T_{OUTPUT}$ to a brake actuator 42 in communication therewith. In various embodiments, the brake actuator 42 is an electromechanical, hydraulic, pneumatic, or other type of actuator, and it applies braking pressure to the wheel assembly 18, such as by exerting a braking force (or torque) through the brake 20 to the wheel 22 in order to stop or slow the wheel 22.

In various embodiments, the wheel speed sensor 24 of the wheel assembly 18 measures the speed of the wheel 22, including during braking operations. In various embodiments, the speed of the wheel 22 is based on measuring an angular velocity of the wheel 22 multiplied by a radius of the wheel 22, and the wheel speed sensor 24 outputs a wheel speed signal $V_{WHEEL}$ of the wheel 22 to the antiskid brake controller 34.

In various embodiments, the antiskid brake controller 34 receives the wheel speed signal $V_{WHEEL}$ and compares it to a reference speed signal $V_{REFERENCE}$ to determine a wheel speed error. This occurs throughout the braking operation, for which the wheel speed sensor 24 periodically and/or continually outputs the wheel speed signal $V_{WHEEL}$ to the antiskid brake controller 34 multiple times during the braking operation.

Based on the wheel speed signal $V_{WHEEL}$, the antiskid brake controller 34 calculates the wheel speed error and sends an adjustment signal K to the integrator I of the PID controller 44, which is intermediate the BCU 26 and the brake actuator 42. If the wheel speed error is large in relation to the wheel speed signal $V_{WHEEL}$, the antiskid brake controller 34 determines that a skid is occurring, and the adjustment signal K is large. On the other hand, if the wheel speed error is small in relation to the wheel speed signal $V_{WHEEL}$, the antiskid brake controller 34 determines that a skid is not occurring, and the adjustment signal K is small and/or zero.

In either event, the PID controller 44 receives the adjustment signal K from the antiskid brake controller 34 and adjusts the control signal $T_{OUTPUT}$ into the modified control signal $T_{OUTPUT}'$ that is input into the brake actuator 42 to control the brake assembly 18, as implemented by the PID controller 44. The PID controller 44 calculates a difference between its setpoint and its feedback, called the error, and it eliminates the error. A PID control algorithm executed by the PID controller 44 varies the proportional, integral, and derivative terms to set a desired response, with the proportional term proportional to the error, the integral term proportional to the integral of the error, and the derivative term proportional to the derivative of the error.

Since the antiskid brake controller 34 calculates the wheel speed error many times over in real-time during braking operations, the antiskid brake controller 34 is continually adjusting the adjustment signal K based on the wheel speed signal $V_{WHEEL}$. When the wheel speed error is small in relation to wheel speed (i.e., no skid), the modified control signal $T_{OUTPUT}'$ is the same or approximately the same as the control signal $T_{OUTPUT}$ from the BCU 26. However, when the wheel speed error is large in relation to wheel speed (i.e., skid), the modified control signal $T_{OUTPUT}'$ will deviate more substantially from the control signal $T_{OUTPUT}$ from the BCU 26, thereby allowing the brake actuator 42 to dynamically adjust braking the wheel assembly 18 as to the occurrence of a possible skid in relation to wheel speed. Accordingly, the reset schedule of the integrator I is continually reset based on wheel speed, and the margins of the PID controller's 44 reset schedule are varied in proportion to wheel speed. This provides for improved detection and/or mitigation of skids at slower wheel speeds, where they are harder to detect and mitigate relative to detecting and/or mitigating skids at higher wheel speeds.

Figure 5:
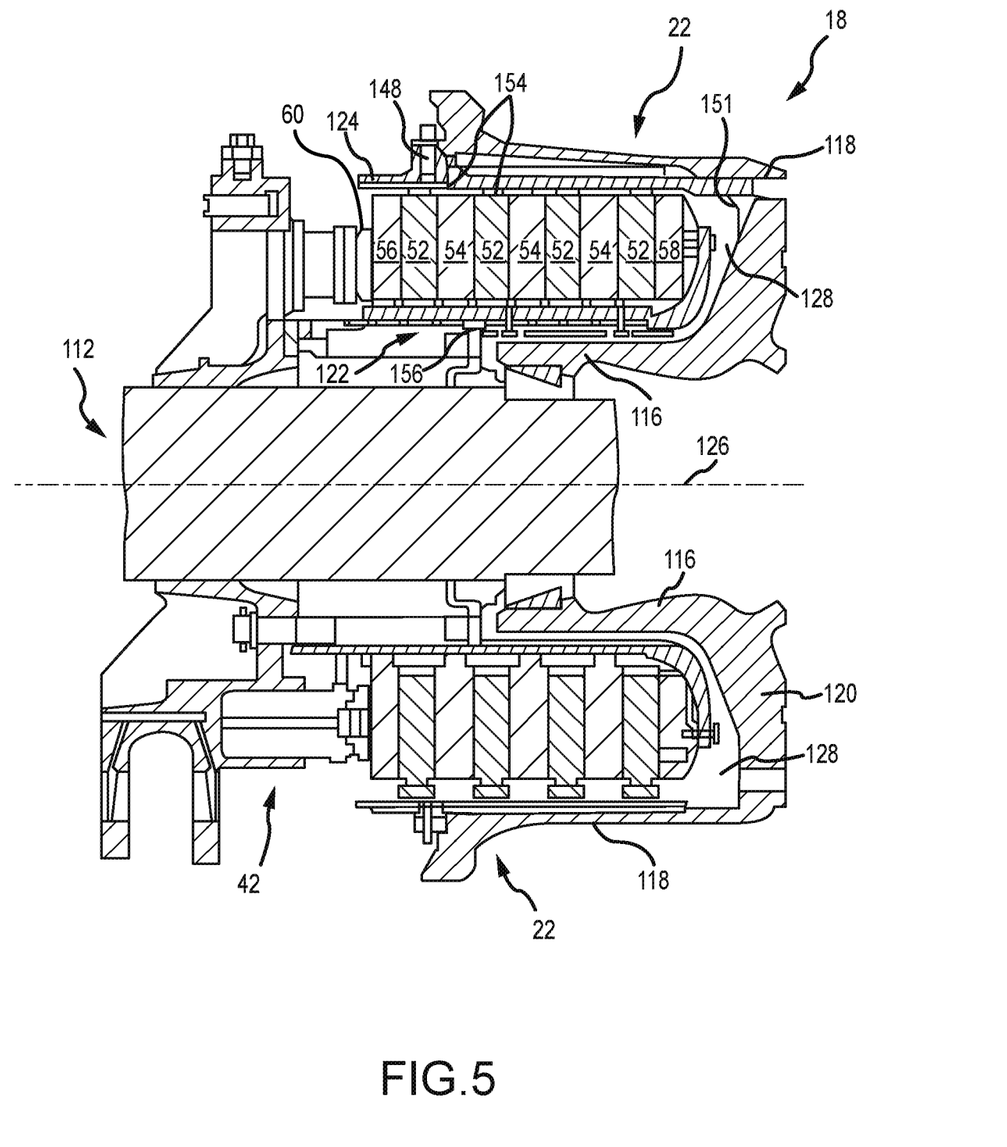
FIG. 5 is a cross-sectional view of a part of a brake assembly, in accordance with various embodiments.

Referring now also to FIG. 5, a cross-sectional view of a part of the brake assembly 18 is illustrated, in accordance with various embodiments. In various embodiments, the brake assembly 18 comprises a bogie axle 112, the wheel 22, including a hub 116, a wheel well 118, a web 120, a torque take-out assembly 122, one or more torque bars 124, a wheel rotational axis 126, a wheel well recess 128, the brake actuator 42, multiple brake rotors 52, multiple brake stators 54, a pressure plate 56, an end plate 58, a ram 60, multiple torque bar bolts 148, a torque bar pin 151, multiple rotor lugs 154, and multiple stator slots 156.

Brake disks (e.g., the interleaved brake rotors 52 and brake stators 54) are disposed in the wheel well recess 128 of the wheel well 118. In various embodiments, the brake rotors 52 and the brake stators 54 are referred to collectively as a brake stack or heat sink. In various embodiments, the brake rotors 52 are secured to the torque bars 124 for rotating with the wheel 22, while the brake stators 54 are, in various embodiments, engaged with the torque take-out assembly 122. In various embodiments, at least one brake actuator 42 is operable to compress the interleaved brake rotors 52 and the brake stators 54 for stopping the aircraft 10 of FIG. 1. In the embodiment of FIG. 5, the brake actuator 42 is shown as a hydraulically actuated piston, although pistons driven pneumatically and/or by electromechanical actuators are also contemplated herein, in various embodiments. The pressure plate 56 and the end plate 58 are disposed at opposite ends of the interleaved brake rotors 52 and the brake stators 54, and the ram 60 is disposed proximate the pressure plate 56.

Through compression of the brake rotors 52 and the brake stators 54 between the pressure plate 56 and the end plate 58, the resulting frictional contact slows, stops, and/or prevents rotation of the wheel 22. In various embodiments, the torque take-out assembly 122 is secured to a stationary portion of a landing gear truck, such as a bogie beam or other landing gear strut, such that the torque take-out assembly 122 and the brake stators 54 are prevented from rotating during braking of the aircraft 10 of FIG. 1.

Figure 6:
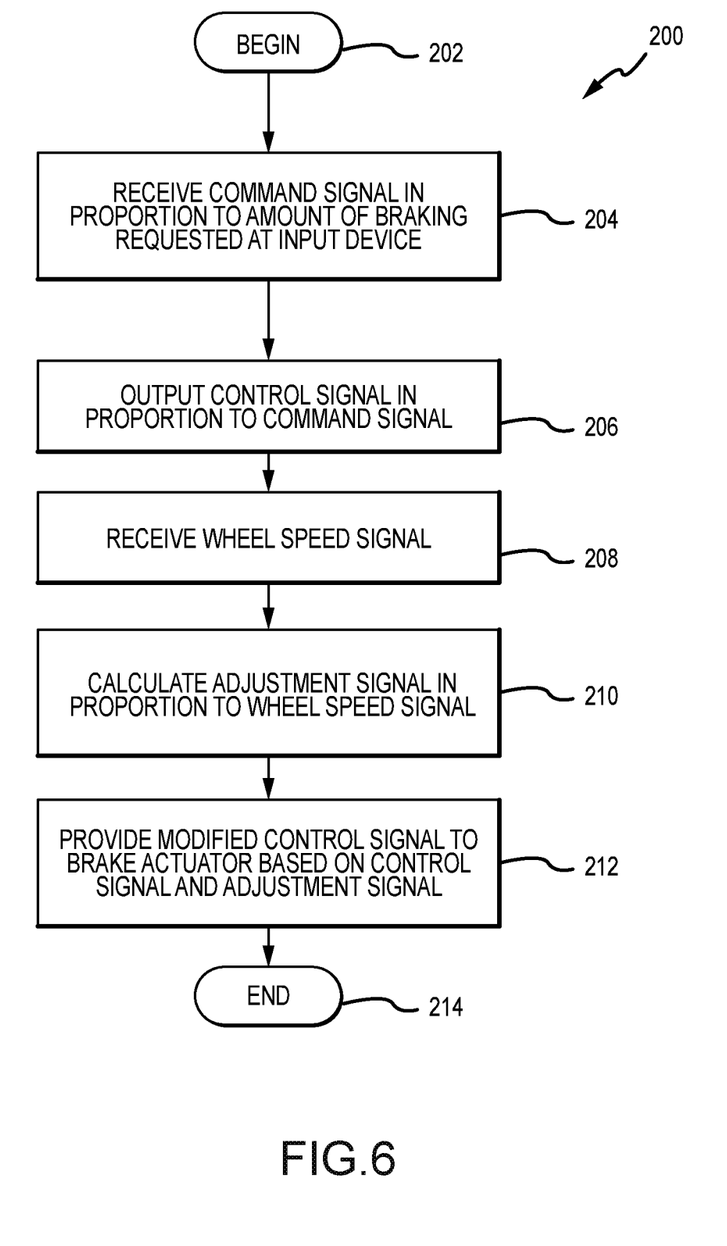
FIG. 6 illustrates a method of mitigating a skid that can be used with the embodiments of FIGS. 1-5, in accordance with various embodiments.

Referring now also to FIG. 6, a method for controlling braking operations (e.g., controlling skids) as applied to a wheel 22 of a wheel assembly 18 is illustrated, in accordance with various embodiments. More specifically, the method 200 begins in a step 202, after which a command signal $T_C$ is received from an input device 32 in proportion to an amount of braking requested at the input device 32 at a step 204. In various embodiments, the command signal $T_C$ is received by the BCU 26, which outputs a control signal $T_{OUTPUT}$ in proportion to the command signal $T_C$ at a step 206. In addition, a wheel speed signal $V_{WHEEL}$ is calculated by a wheel speed sensor 24 and received by an antiskid brake controller 34 at a step 208, the wheel speed signal $V_{WHEEL}$ indicative of a speed of the wheel 22 of the wheel assembly 18. In addition, the antiskid brake controller 34 calculates an adjustment signal K in proportion to the wheel speed signal $V_{WHEEL}$ in a step 210. In various embodiments, the antiskid brake controller 34 provides the adjustment signal K to the PID controller 44, which receives the control signal $T_{OUTPUT}$ and the adjustment signal K. The PID controller 44 provides a modified control signal $T_{OUTPUT}'$ based on the control signal $T_{OUTPUT}$ and the adjustment signal K to a brake actuator 42 in communication with the wheel assembly 18 at a step 212, after which the method 200 ends in step 214.

In accordance with the description herein, technical benefits and effects of this disclosure include mitigating the effects of brake skids at different speeds. In various embodiments, the systems and methods mitigate skids differently at different speeds by transmitting an adjustment signal to an integrator to adjust a control signal and an adjustment signal K into a modified control signal in order to command a brake actuator.

Advantages, benefits, and solutions to problems have been described herein with regard to specific embodiments. Furthermore, connecting lines shown in the various figures contained herein are intended to represent exemplary functional relationships and/or physical couplings between the various elements. It should be noted that many additional or alternative functional relationships or physical connections may be present in a practical system. However, the advantages, benefits, solutions to problems, and any elements that may cause any advantage, benefit, or solution to occur or become more pronounced are not to be construed as critical, essential, or required elements or features of this disclosure.

The scope of this disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural, and vice-versa. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching may be used throughout the figures to denote different parts, but not necessarily to denote the same or different materials. Like depictions and numerals also generally represent like elements.

The steps recited in any of the method or process descriptions may be executed in any order and are not necessarily limited to the order presented. Furthermore, any reference to singular elements, embodiments, and/or steps includes plurals thereof, and any reference to more than one element, embodiment, and/or step may include a singular one thereof. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, connected, fixed, or the like may include full, partial, permanent, removable, temporary and/or any other possible attachment option. Additionally, any reference to without contact (or similar phrases) may also include reduced contact or minimal contact. Surface shading lines may be used throughout the figures to denote different areas or parts, but not necessarily to denote the same or different materials. In some cases, reference coordinates may or may not be specific to each figure.

Apparatus, methods, and systems are provided herein. In the detailed description herein, references to "one embodiment," "an embodiment," "various embodiments," etc., indicate that the embodiment described may include a particular characteristic, feature, or structure, but every embodiment may not necessarily include this particular characteristic, feature, or structure. Moreover, such phrases may not necessarily refer to the same embodiment. Further, when a particular characteristic, feature, or structure is described in connection with an embodiment, it is submitted that it is within the knowledge of one skilled in the art to affect such characteristic, feature, or structure in connection with other embodiments, whether or not explicitly described. After reading the description, it will be apparent to one skilled in the relevant art(s) how to implement this disclosure in alternative embodiments.

Furthermore, no component, element, or method step in the present disclosure is intended to be dedicated to the public regardless of whether the component, element, or method step is explicitly recited in the claims. No claim element is intended to invoke 35 U.S.C. § 112(f) unless the element is expressly recited using the phrase "means for." As used herein, the terms "comprises," "comprising," or any other variation thereof, are intended to cover a non-exclusive inclusion, such that an apparatus, article, method, or process that comprises a list of elements does not include only those elements, but it may also include other elements not expressly listed or inherent to such apparatus, article, method, or process.

I claim:

1. A brake control system for controlling a braking operation applied to a wheel of a wheel assembly, comprising:
    a brake control unit configured to output a control signal to a Proportional Integral Derivative (PID) controller;
    the PID controller in communication with the brake control unit, the PID controller configured to receive the control signal from the brake control unit and an adjustment signal from an antiskid brake controller and output a modified control signal;
    a wheel speed sensor configured to output a wheel speed signal indicative of a speed of the wheel to the antiskid brake controller; and
    the antiskid brake controller in communication with the PID controller and with the wheel speed sensor, the antiskid brake controller configured to receive the wheel speed signal from the wheel speed sensor and to provide the adjustment signal to the PID controller;
    wherein the antiskid brake controller provides the adjustment signal to the PID controller in proportion to the wheel speed signal;
    wherein the modified control signal is adjusted based on the control signal and the adjustment signal; and
    wherein a reset schedule of an integrator of the PID controller is continually reset based on the wheel speed signal, and wherein a margin of the reset schedule is varied in proportion to the speed of the wheel.

2. The brake control system of claim 1, wherein the modified control signal is adjusted during the braking operation.

3. The brake control system of claim 1, wherein the modified control signal is adjusted throughout the braking operation.

4. The brake control system of claim 1, wherein the wheel speed sensor measures the speed of the wheel during the braking operation.

5. The brake control system of claim 4, wherein the speed of the wheel is based on measuring an angular velocity of the wheel multiplied by a radius of the wheel.

6. The brake control system of claim 1, wherein the adjustment signal is based, at least in part, on at least one of a reference speed signal and a mu-slip curve.

7. The brake control system of claim 1, wherein the adjustment signal comprises a first threshold at a first speed and a second threshold at a second speed, wherein the first speed is slower than the second speed and the first threshold is smaller than the second threshold.

8. The brake control system of claim 1, wherein the wheel assembly is configured for use in an aircraft.

9. A method for controlling a braking operation applied to a wheel of a wheel assembly, comprising:
receiving a command signal in proportion to an amount of braking requested at an input device;
outputting a control signal in proportion to the command signal;
receiving a wheel speed signal indicative of a speed of the wheel;
calculating an adjustment signal in proportion to the wheel speed signal;
providing a modified control signal to a brake actuator based on the control signal and the adjustment signal; and
continually resetting a reset schedule based on the wheel speed signal, wherein a margin of the reset schedule is varied in proportion to the speed of the wheel.

10. The method for controlling the braking operation of claim 9, further comprising:
braking the wheel in proportion to the modified control signal.

11. The method for controlling the braking operation of claim 9, further comprising:
adjusting the adjustment signal during the braking operation.

12. The method for controlling the braking operation of claim 9, further comprising:
adjusting the adjustment signal throughout the braking operation.

13. The method for controlling the braking operation of claim 9, further comprising:
adjusting the modified control signal during the braking operation.

14. The method for controlling the braking operation of claim 9, further comprising:
adjusting the modified control signal throughout the braking operation.

15. The method for controlling the braking operation of claim 9, further comprising:
calculating the adjustment signal based, at least in part, on at least one of a reference speed signal and a mu-slip curve.

16. A brake control system for controlling a braking operation applied to a wheel of a wheel assembly, comprising:
a non-transitory memory configured to store instructions; and
one or more processors in electronic communication with the non-transitory memory, the one or more processors configured to:
receive a command signal in proportion to an amount of braking requested at an input device;
output a control signal in proportion to the command signal;
receive a wheel speed signal indicative of a speed of the wheel;
calculate an adjustment signal in proportion to the wheel speed signal;
provide a modified control signal to a brake actuator based on the control signal and the adjustment signal; and
continually reset a reset schedule based on the wheel speed signal, wherein a margin of the reset schedule is varied in proportion to the speed of the wheel.

17. The brake control system of claim 16, wherein the one or more processors are further configured to:
brake the wheel in proportion to the modified control signal.

18. The brake control system of claim 16, wherein the one or more processors are further configured to at least one of:
receive the wheel speed signal during the braking operation;
calculate the adjustment signal during the braking operation; and
provide the modified control signal during the braking operation.

19. The brake control system of claim 16, wherein the one or more processors are further configured to at least one of:
receive the wheel speed signal throughout the braking operation;
calculate the adjustment signal throughout the braking operation; and
provide the modified control signal throughout the braking operation.

20. The brake control system of claim 16, wherein the one or more processors are further configured to:
calculate the adjustment signal based, at least in part, on at least one of a reference speed signal and a mu-slip curve.

* * * * *